United States Patent

Husson, Jr.

[11] 3,971,152
[45] July 27, 1976

[54] FISHING LURE
[75] Inventor: Frank Husson, Jr., La Jolla, Calif.
[73] Assignee: Applied Oceanographic Technology Corporation, Southampton, N.Y.
[22] Filed: May 14, 1975
[21] Appl. No.: 577,551

[52] U.S. Cl.............................. 43/42.06; 43/42.28; 43/42.32; 43/42.38
[51] Int. Cl.² ........................................ A01K 85/00
[58] Field of Search............ 43/42.06, 42.22, 42.38, 43/42.28, 42.32

[56] References Cited
UNITED STATES PATENTS

| | | | |
|---|---|---|---|
| 810,822 | 1/1906 | Tinkess | 43/42.06 |
| 2,256,813 | 9/1941 | Mikina | 43/42.06 |
| 2,750,703 | 6/1956 | Puste | 43/42.06 X |

FOREIGN PATENTS OR APPLICATIONS

| 15,047 | 3/1906 | Norway | 43/42.38 |
|---|---|---|---|

Primary Examiner—Louis G. Mancene
Assistant Examiner—Daniel J. Leach
Attorney, Agent, or Firm—James J. Burke

[57] ABSTRACT

A molded, elastomeric fishing lure having an internal cavity for retaining a fish-attracting olfactory agent such as freeze-dried squid pellets, and including one or more openings into said cavity at the forward end for the ingress of water, and one-way insertion and retaining means at the aft end, where the pellet may be inserted, and which allows for egress of water. In a preferred embodiment, the lure has the general shape of a squid and locks at the forward end onto a head piece having an integral hook which extends through the lure into the leg section, the head piece including bendable, laterally-extending diving planes.

8 Claims, 5 Drawing Figures

FISHING LURE

BACKGROUND OF THE INVENTION

The present invention relates generally to fishing lures and, more particularly, it relates to a molded, elastomeric plastic lure adapted to retain a slowly-dissolvable pellet of a fish-attracting olfactory agent in an internal cavity. The lure may be used, in particular embodiments, for trolling, jigging off the bottom, and for surf casting.

Many fishing lures have been proposed heretofore including means for retaining live minnows, or a pervious bait bag, or other means for holding a live or dead bait or pieces of fish. The object in all cases to allow water to pass through the retaining means and pick up a fishy "smell" which acts as an attractant for the game being sought. Typical of many patents in this area are Nos. 3,688,430, 3,748,772, 3,273,277 and 3,031,791.

OBJECTS OF THE INVENTION

A general object of the present invention is to provide an improved fishing lure.

A more particular object of the present invention is to provide a fishing lure including means for retaining and, in use, slowly dissolving, a fish-attracting agent.

Another object of the present invention is to provide a fishing lure that has a life-like "action" in any one of several modes of operation.

Various other objects and advantages of the invention will become clear from the following description of embodiments, and the novel features will be particularly pointed out in connection with the appended claims.

THE DRAWINGS

Reference will hereinafter be made to the accompanying drawings, wherein.

DESCRIPTION OF EMBODIMENTS

The invention will be described and illustrated with reference to embodiments resembling squid, but it will be appreciated that other shapes attractive to fish may be employed.

Figure 1:
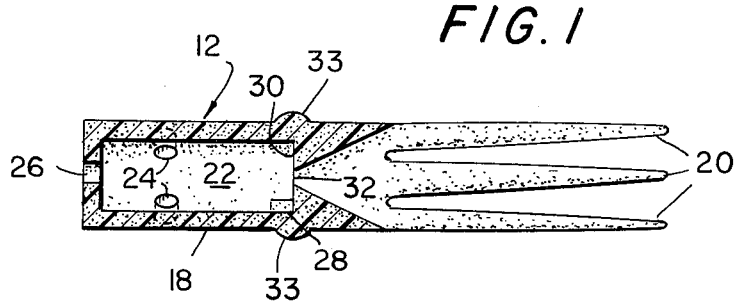
FIG. 1 is a cross-sectional elevation of the molded elastomeric body portion of one embodiment of the invention.

The lure 10 includes a body portion 12 and a head portion 14 including an integral hook 16. With reference to FIG. 1, body portion 12 is a one piece, molded unit fabricated from a suitable elastomeric material such as a vinyl plastisol. For injection molding, a material sold under the name Kraton, manufactured by Shell Chemical Co., is preferred.

Body portion 12 comprises a forward hollow cylinder 18 and an aft leg portion 20 resembling the legs (or arms) of squid. Cylinder 18 defines a central cavity 22. One or more openings 24 in the side walls of cylinder 18 provide for the ingress of water in use. An axial opening 26 in the forward wall of cylinder 18 is used in assembling the body and head portions.

The aft wall of cavity 22 includes a pair of inwardly-facing shoulders 28, 30 defining a narrow slit 32 therebetween, which widens out with distance in the aft direction. Slit 32 functions as the opening through which the pellet of freeze-dried squid or other fish attractant can be inserted, and through which water will egress, as during trolling.

A pair of lateral projections 33 are molded into the sides of the body and painted to resemble the eyes of the squid.

Figure 2:
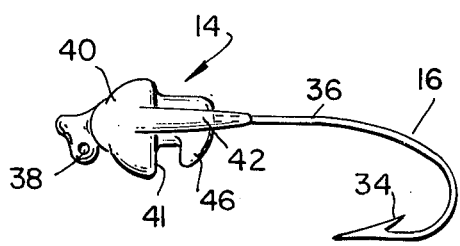
FIG. 2 and FIG. 3 are elevation and plan views, respectively, of the integral head-hook portion of the same embodiment of the invention.
Figure 3:
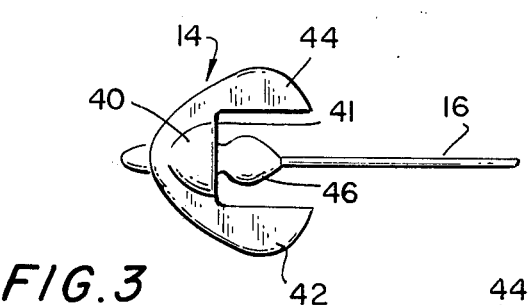

With reference to FIGS. 2 and 3, hook 16 is entirely conventional and includes a barb 34, a shank 36 and an eye 38 for attachment to the terminal tackle. The head 14 is cast from pure lead around shank 36 and comprises a generally conical tip 40 having a base 41 of the same diameter as the forward wall of cylinder 18, two laterally and rearwardly extending diving planes 42, 44 adapted to fit around the sides of cylinder 18, and an axial knob 46 spaced from base 41 on shank 36.

Figure 4:
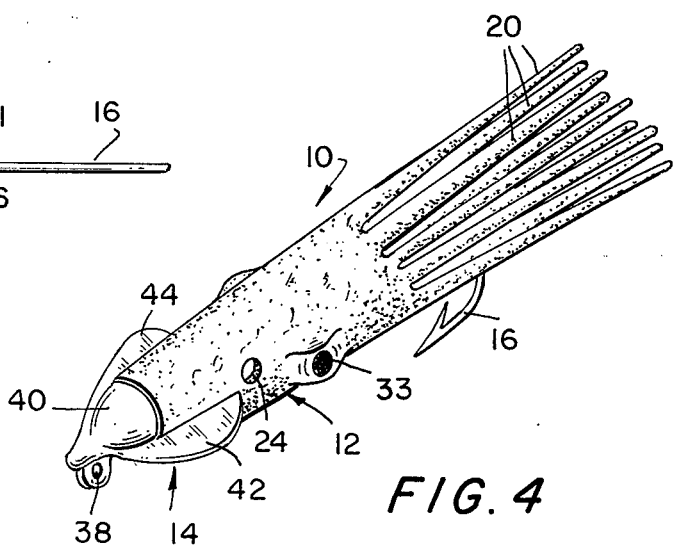
FIG. 4 is a perspective view of the FIGS. 1-3 embodiment, assembled and ready for use.

The lure is assembled by first passing hook 16 through opening 26 and slit 32 and then forcing opening 26 over knob 46, thereby locking the forward wall of cylinder 18 snugly against base 41 of the head. The assembled lure is shown in FIG. 4.

By using pure lead for head 14, it is possible to bend planes 42, 44 up or down and thereby control the swimming action of the lure in use. Of course, head 14 may also be molded from plastic in applications where the weight of the lead is not required.

Figure 5:
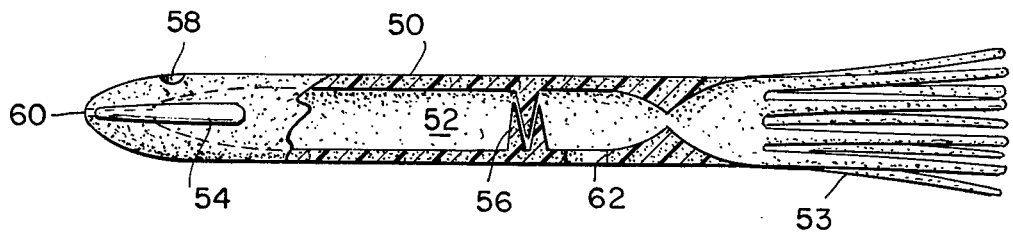
FIG. 5 is an elevation view, partially sectioned, of a second embodiment of the invention.

An alternative embodiment of the invention is illustrated in FIG. 5. This lure, which also is shaped to resemble a squid, is a one-piece molded elastomer which is particularly adapted for billfish trolling.

It is the habit of marlin, swordfish and the like to first hit a bait fish with their bill to stun it and thereafter take the fish into the mouth. They will hold the fish in their mouth for a number of seconds and then either take (swallow) it or reject it, presumably depending on taste.

The lure of FIG. 5 includes a hollow cylindrical portion 50 defining a cavity 52 and a leg portion 53 as in the previous embodiment. Diving planes 54 are integrally molded on the sides of the cylinder in this embodiment. The aft end of the cylinder 50 is closed with a plurality of vanes or weirs 56 extending inwardly from opposite walls, which provides a tortuous path for exiting water. A forward opening 58 is provided as in other embodiments, together with a front opening 60. An aft slit 62 provides for egress of water. Terminal tackle (excepting the hook) is threaded through opening 60, cavity 52, vanes 56 and out the aft end, where the hook (not shown) is attached. Alternatively a tube (not shown) may be molded into the lure running from opening 60 to the aft end, for ease in changing leaders. The advantage of this lure for billfish is that when it is taken into the mouth cavity 52 is compressed and an amount of the "tasty" water is released.

While a variety of attractants in pellet form can be used with the invention, it is preferred to employ powdered, freeze-dried squid mixed with soybean powder, citric acid, sodium bicarbonate, fillers, binders and wicking agents, all of which are compressed into tablet form.

Various changes in the details, steps, materials and arrangements of parts, which have been herein described and illustrated to explain the nature of the invention, may be made by those skilled in the art within the principle and scope of the invention as defined in the appended claims.

What is claimed is:

1. A fishing lure comprising:
   a flexible, elastomeric body comprising a hollow cylinder having axial forward and aft ends;
   inwardly extending shoulders within said cylinder defining said aft end and including a narrow opening therebetween;
   at least one opening in the wall of said cylinder;
   an axial opening in the forward end of said cylinder;
   a solid head including an integral hook extending aft from the base of said head, said body being adapted to slide over said hook and against said base;
   means locking said head against said body; and
   eye means in said head for attaching said lure to a line.

2. The fishing lure as claimed in claim 1, wherein said lure resembles a squid, and further comprising:
   a plurality of squid-like flexible legs extending aft from around said narrow opening; and
   a pair of protrusions on opposed sides of said cylinder adapted to resemble eyes.

3. The fishing lure as claimed in claim 1, wherein said head is generally cone shaped, said eye means is adjacent the tip thereof, and additionally including a pair of outwardly and rearwardly extending diving planes, said planes fitting around opposed sides of said cylinder.

4. The fishing lure as claimed in claim 3, wherein said head is made of lead, and said diving planes are bendable.

5. The fishing lure as claimed in claim 1, wherein said locking means comprises a knob on the shank of said hook spaced from said base and adapted to be inserted through said axial opening.

6. The fishing lure as claimed in claim 1 and additionally comprising a slowly-dissolvable pellet including fish-attracting ingredients, said pellet being adapted for insertion into said hollow cylinder through said narrow opening and, in use, be retained therein by said shoulders.

7. A fishing lure resembling a squid comprising:
   a flexible, elastomeric body including flexible legs extending from the aft end and integral protrusions resembling eyes and diving planes on opposed sides;
   a cylindrical cavity within said body closed at the aft end by a plurality of inwardly-extending, closely spaced vanes or weirs extending from opposite sides of said cavity;
   at least one opening to said cavity in the wall of said body; and
   an opening in the forward end of said body for insertion of terminal tackle through said body.

8. The fishing lure as claimed in claim 7, and additionally comprising a slowly-dissolvable pellet including fish-attracting ingredients, said pellet being adapted for insertion into said cavity through said vanes or weirs and, in use, be retained in said cavity thereby.

* * * * *